United States Patent [19]
Zick

[11] 3,760,706
[45] Sept. 25, 1973

[54] CONTROL INSTALLATION FOR AIR OR GAS STREAMS OF VENTILATION SYSTEMS

[75] Inventor: Manfred Zick, Waiblingen, Germany

[73] Assignee: Daimler-Benz Aktiengesellschaft, Stuttgart-Untertuerkheim, Germany

[22] Filed: Mar. 30, 1971

[21] Appl. No.: 129,530

[30] Foreign Application Priority Data
Apr. 1, 1970 Germany................... P 20 15 409.0

[52] U.S. Cl. ................................ 98/2.06, 137/81.5
[51] Int. Cl. ............................................. B60h 1/24
[58] Field of Search ................. 137/81.5; 98/2, 2.06

[56] References Cited
UNITED STATES PATENTS

| | | |
|---|---|---|
| 3,198,431 | 8/1965 | Gesell ............................... 137/81.5 |
| 3,266,510 | 8/1966 | Wadey ............................... 137/81.5 |
| 3,572,357 | 3/1971 | Philbrick ........................... 137/81.5 |
| 3,578,009 | 5/1971 | Spyropoulos ....................... 137/81.5 |

Primary Examiner—Meyer Perlin
Attorney—Craig, Antonelli, Stewart & Hill

[57] ABSTRACT

A control installation for air or gas streams of ventilation systems, especially for motor vehicles, in which a fluid control device arranged in the air or gas stream includes a through-channel for the air or gas stream and a branch line whereby a control channel is disposed opposite the branch line whose control pressure is subjected at least approximately to the fluctuations of the air or gas stream.

23 Claims, 3 Drawing Figures

INVENTOR
MANFRED ZICK

BY Craig, Antonelli,
Stewart & Hill
ATTORNEYS

CONTROL INSTALLATION FOR AIR OR GAS STREAMS OF VENTILATION SYSTEMS

The present invention relates to a control installation for air or gas streams of ventilation systems, especially in vehicles.

In practice, one encounters considerable difficulties in maintaining constant the air or gas streams of ventilation installations. For example, in vehicles the air stream is taken off for the ventilation installations in the front end area of the vehicle and is fed to the vehicle interior space by way of an air channel. The supplied quantity is dependent on the vehicle velocity, i.e., it increases with increasing vehicle velocity. This behavior may become noticeable unpleasantly in particular with motor vehicles, if the ventilation installation is adjusted for low vehicle velocities and the vehicle velocity is increased nonetheless. Since no automatic regulating installation is provided with the known ventilating systems, an adjustment on the part of the driver is for the most part only carried out manually when the ventilation has become disagreeably strong.

The present invention is concerned with the task to provide for ventilation systems a control installation which carries out automatically the function of maintaining constant the air or gas flows and which is realizable with structurally simple means. The present invention essentially consists in that a fluidic control system is arranged in the air or gas stream which includes for the air or gas stream a through-channel and a branch channel, whereby a control channel is disposed opposite the branch channel whose control pressure is subjected at least approximately to the fluctuation of the air or gas stream. It is achieved thereby that beginning with a predetermined magnitude of the control pressure of the control channel, only a predetermined air or gas quantity flows off through the through-channel, whereas the control channel effects a splitting off of the air or gas stream into the branch line whose magnitude is dependent from the supplied air or gas quantity.

In order to achieve a favorable control behavior, it has proved as particularly advantageous if the through-channel is enlarged by offsetting the wall disposed downstream of the branch connection.

It is possible in a structurally simple manner to maintain the control pressure dependent on the air or gas stream if the inlet of the control channel branches off from the through-channel or from the air or gas channel. The control pressure is thereby obtained from a part of the air or gas stream and is therefore subjected to the same fluctuations. With vehicles, it is also possible to connect the control channel with a place of the vehicle at which occurs during the drive the same hydrodynamic pressure or a hydrodynamic pressure following a predetermined characteritic curve as at the inlet place of the air or gas channel. Also in that case a constant interdependency between the control pressure and the air or gas stream is obtained.

In order to achieve an individual control, which is advantageous for example for vehicles, the cross section of the control channel may be adjustable.

A structurally simple and advantageous embodiment of the present invention is obtained if the control channel is formed by a bulge portion of the through-channel and by a wing-like member. It is thereby particularly appropriate if the wing is mounted rotatably and/or displaceably.

According to a further feature of the present invention, provision may be made in order to refine the effect of the control installation that a further fluidic control device is connected in the input of the control channel.

Accordingly, it is an object of the present invention to provide a control installation for air or gas streams of ventilation systems, especially of motor vehicles, which avoids by simple means the aforementioned shortcomings and drawbacks encountered in the prior art.

Another object of the present invention resides in a control installation for air or gas streams of ventilation systems which automatically controls the amount of air or gas flow supplied to the interior of the vehicle so as to minimize fluctuations as a result of changes in the hydrodynamic pressure caused by changes in the vehicle velocity.

A further object of the present invention resides in a control installation of the type described above which is simple in construction as well as effective in its operation.

These and other objects, features and advantages of the present invention will become more obvious from the following description when taken in connection with the accompanying drawing which shows, for purposes of illustration only, one embodiment in accordance with the present invention, and wherein.

Figure 1:
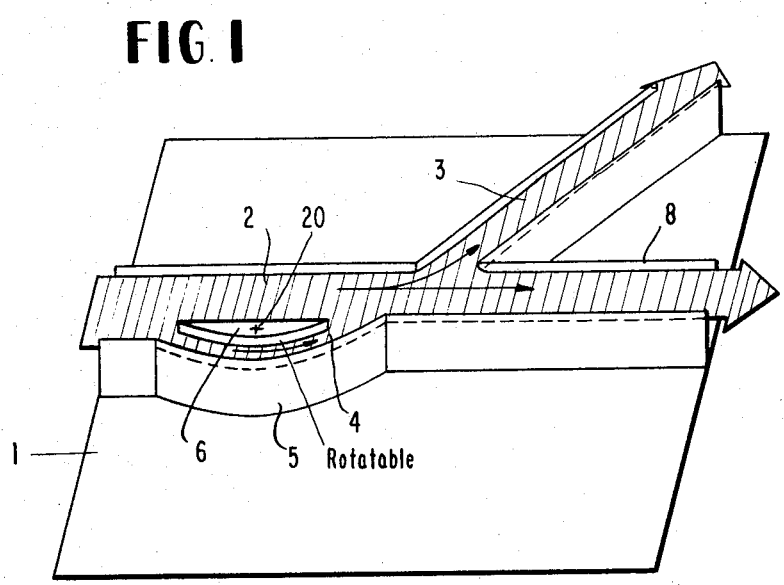
FIG. 1 is a schematic perspective view of a control installation in accordance with the present invention.

Referring now to the drawing and, more particularly, to FIG. 1, reference numeral 1 schematically indicates a fluidic control device which can be installed in an air or gas channel of an air or gas stream of a ventilation installation. The fluidic control device 1 includes a through-channel 2 for the gas or air stream from which branches off a branch line 3. In order to achieve that only a constant air or gas quantity flows off by way of the through-channel 2 independently of the supplied quantity, which is to serve as useful quantity for the ventilation installation, the air or gas stream is subdivided at the branch 3 if it exceeds a predetermined magnitude. This takes place by means of a control channel 4 which terminates in or discharges into the through-channel 2 opposite the branch 3 in the direction of the latter. The control channel 4 is formed by a bulged portion 5 of the through-channel 2 and by a wing element 6 arranged therein. Since the control channel 4 branches off directly upstream of the through-channel 2, its control pressure is directly dependent on the air or gas quantity supplied to the fluidic control system 1.

Figure 3:
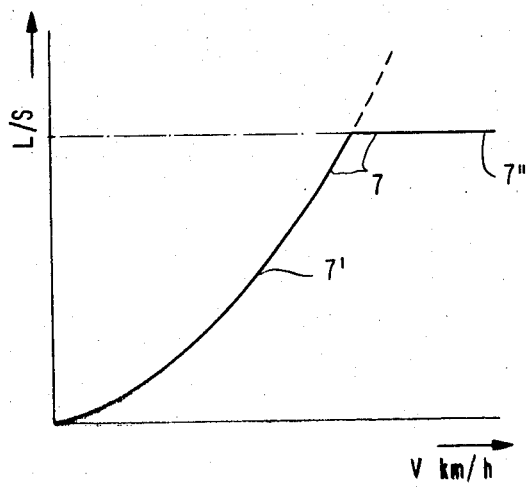
FIG. 3 is a diagram illustrating the effect of a control installation according to FIGS. 1 or 2.

By the dimensioning of the cross section of the control channel 4, the force can be determined which acts on the air or gas stream in the direction of the branch 3 and deflects the same into the branch line 3. As shown in FIG. 3, in which velocity v in km/hr. is plotted against quantity of gas supplied per second, the control channel 4 is so dimensioned that in a starting range which corresponds to relative low vehicle velocities of a vehicle or to relative low supplied air or gas quantities, no or only a slight splitting off of the air or gas stream takes place by the control pressure. The effect of the control channel 4 starts only with larger air or gas quantities whereby the deflection into the branch line 3 becomes so strong that in the ranges lying above the same, the air or gas stream discharged by way of the through-channel 2 is kept constant whereas the air or gas quantity exceeding the same is discharged by way of the branch channel 3. In order to obtain a curve which follows as accurately as possible the characteristic curve 7 of the diagram of FIG. 3, the through-channel 2 of the fluidic control system 1 may be enlarged by a displacement of the wall 8 disposed downstream of the branch 3. The characteristic curve 7 is composed of an unregulated portion 7' and of a portion 7'' controlled by the fluidic system.

Figure 2:
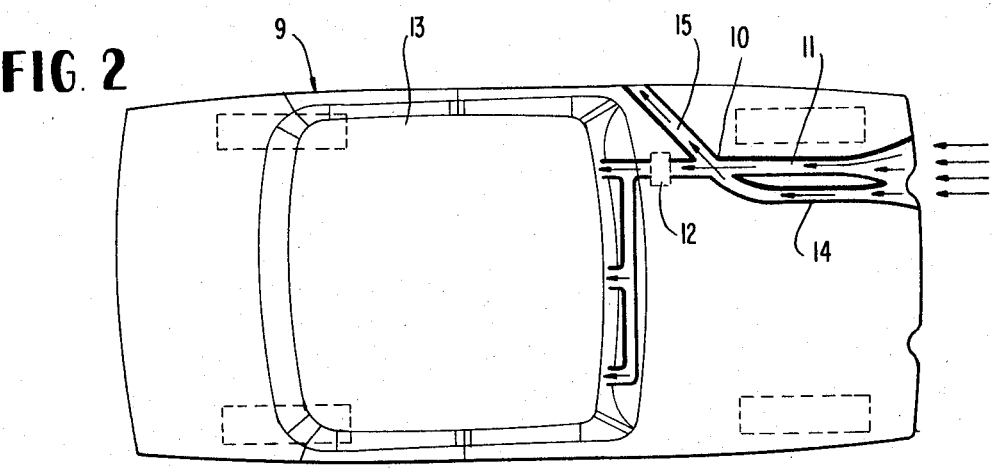
FIG. 2 is a schematic plan view of a passenger motor vehicle illustrating the application of a control installation in accordance with the present invention to such vehicle.

In FIG. 2, a control installation according to the present invention is installed into a passenger motor vehicle generally designated by reference numeral 9. The fluidic control system 10 is disposed in an air channel 11 which begins in the front end area of the passenger motor vehicle 9 and leads into the vehicle interior space 13 by way of a heat-exchanger 12. The control air for the control channel 14 is taken off from the same inlet place in the front end area of the passenger motor vehicle 9, whereby a branch line 15 is disposed opposite the control channel 14. This branch 15 may, as shown in FIG. 2, lead directly into the atmosphere. However, it is also possible to utilize the air discharged from this branch line 15 for the cooling of hot aggregates, for example, of the disc brakes or of the tires. Also, with this type of construction, the control channel 14 is so dimensioned that an effect corresponding to the diagram according to FIG. 3 results.

At lower vehicle velocities, on which the air quantity fed to the air channel 11 is dependent directly, the air quantity is not influenced by the control channel 14, that is, not deflected into the branch line 15. This only takes place at higher vehicle velocities in such a manner that the air quantity flowing to the heat-exchanger 12 is kept constant whereas the air quantity discharged out of the branch line 15 increases with the vehicle velocity.

In order to enable an individual adjustment by the driver or by the other vehicle passengers, the usual adjusting means, not illustrated in detail in the drawing, are provided in a conventional manner, by means of which the air quantity fed into the air channel 11 can be adjusted. Therebeyond, a control can be also realized corresponding to the embodiment according to FIG. 1 in such a manner that the effect of the fluidic control system 1 is adjustable manually. For that purpose, the wing member 6 can be arranged adjustably in the fluidic system according to FIG. 1 so that the magnitude of the control pressure is adjustable thereby. The wing member 6 can be displaceable appropriately in the axial direction of the through-channel 2 and additionally may also be rotatable about the axis of rotation 20 via a suitable means.

While I have shown and described only one embodiment in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A control installation for a ventilation system arranged in a vehicle, the ventilation system having a duct means open toward the front in the driving direction of the vehicle and leading to the interior of the vehicle for conducting a fluid stream therein, characterized in that a fluid control means is arranged in the vehicle and includes fluid channel means arranged in the fluid stream, the fluid channel means including a through-channel means and a branch means, and in that a control channel means whose control pressure is subjected at least approximately to the fluctuation of the fluid stream has a portion thereof disposed substantially opposite the branch means for controlling a portion of the fluid stream in the through-channel means into the branch means.

2. A control installation according to claim 1, characterized in that the fluid stream is an air stream.

3. A control installation according to claim 1, characterized in that the fluid stream is a gas stream.

4. A control installation according to claim 1, characterized in that the through-channel means is enlarged by an offset of the wall portion thereof disposed downstream of the branch means.

5. A control installation with a fluid channel means according to claim 4, characterized in that the inlet of the control channel means branches off from the fluid channel means.

6. A control installation according to claim 4, characterized in that the inlet of the control channel means branches off from the through channel means.

7. A control installation with a fluid channel means according to claim 4, characterized in that the inlet of the control channel means branches off from the fluid channel means.

8. A control installation for vehicles with a fluid channel means according to claim 5, characterized in that the control channel means is connected with a place of the vehicle at which a hydrodynamic pressure occurs during the drive which is directly related to the hydrodynamic pressure at the inlet place of the fluid channel means.

9. A control installation according to claim 8, characterized in that the hydrodynamic pressure at the place of connection of the control channel means is substantially the same as the hydrodynamic pressure in the fluid channel means.

10. A control installation for vehicles according to claim 8, characterized in that the control channel means is connected with a place of the vehicle at which occurs a hydrodynamic pressure, the hydrodynamic pressure occurring at the inlet place of the fluid channel means and the control channel means serves for controlling the fluid stream in accordance with a predetermined characteristic curve.

11. A control installation according to claim 8, characterized in that the cross section of the control channel means is adjustable.

12. A control installation according to claim 11, characterized in that the control channel means is constituted by a bulged portion of the through-channel means and a wing-like member.

13. A control installation according to claim 12, characterized in that said wing-like member is rotatable.

14. A control installation according to claim 13, characterized in that said wing-like member is displaceably mounted.

15. A control installation according to claim 1, characterized in that the inlet of the control channel means branches off from the through-channel means.

16. A control installation for vehicles with a fluid channel means according to claim 1, characterized in that the control channel means is connected with a place of the vehicle at which a hydrodynamic pressure occurs during the drive which is directly related to the hydrodynamic pressure at the inlet place of the fluid channel means.

17. A control installation according to claim 16, characterized in that the hydrodynamic pressure at the place of connection of the control channel means is substantially the same as the hydrodynamic pressure in the fluid channel means.

18. A control installation for vehicles according to claim 16, characterized in that the control channel means is connected with a place of the vehicle at which occurs a hydrodynamic pressure, the hydrodynamic pressure occurring at the inlet place of the fluid channel means and the control channel means serves for controlling the fluid stream in accordance with a predetermined characteristic curve.

19. A control installation according to claim 1, characterized in that the cross section of the control channel means is adjustable.

20. A control installation according to claim 1, characterized in that the control channel means is constituted by a bulged portion of the through-channel means and a wing-like member.

21. A control installation according to claim 20, characterized in that said wing-like member is rotatable.

22. A control installation according to claim 20, characterized in that said wing-like member is displaceably mounted.

23. A control installation according to claim 22, characterized in that said wing-like member is rotatable.

* * * * *